US012639804B2

(12) United States Patent
He et al.

(10) Patent No.: US 12,639,804 B2
(45) Date of Patent: May 26, 2026

(54) GENERATING MINORITY CLASS DEFECT DETECTION DATA FROM VISUAL INSPECTION DATASET USING SELF-SUPERVISED DEFECT GENERATOR

(71) Applicant: SAP SE, Walldorf (DE)

(72) Inventors: Yinan He, Singapore (SG); Xinyan Chen, Singapore (SG); Rajesh Vellore Arumugam, Singapore (SG); Anantharaman Ravi, Singapore (SG)

(73) Assignee: SAP SE, Walldorf (DE)

( * ) Notice: Subject to any disclaimer, the term of this patent is extended or adjusted under 35 U.S.C. 154(b) by 297 days.

(21) Appl. No.: 18/433,673

(22) Filed: Feb. 6, 2024

(65) Prior Publication Data

US 2025/0252554 A1 Aug. 7, 2025

(51) Int. Cl.
G06T 7/00 (2017.01)

(52) U.S. Cl.
CPC .... G06T 7/001 (2013.01); *G06T 2207/20081* (2013.01); *G06T 2210/12* (2013.01)

(58) Field of Classification Search
None
See application file for complete search history.

(56) References Cited

U.S. PATENT DOCUMENTS

| | | |
|---|---|---|
| 12,518,352 B2 | 1/2026 | Ramesh et al. |
| 2020/0364842 A1 | 11/2020 | Chaton |

| | | | |
|---|---|---|---|
| 2024/0020954 A1 | 1/2024 | Kelkar et al. | |
| 2024/0062362 A1* | 2/2024 | Wang | G06T 7/001 |
| 2024/0273374 A1* | 8/2024 | Lee | G06N 3/045 |
| 2025/0119624 A1* | 4/2025 | Oh | H04N 21/816 |
| 2025/0297566 A1* | 9/2025 | Rouet-Leduc | G06V 20/194 |

FOREIGN PATENT DOCUMENTS

| | | |
|---|---|---|
| CN | 114764765 | 7/2022 |
| CN | 116468725 | 9/2023 |
| CN | 116703874 | 9/2023 |
| CN | 116993976 | 11/2023 |
| EP | 4123506 | 1/2023 |
| WO | WO 2022119870 | 6/2022 |
| WO | WO 2022161974 | 8/2022 |

OTHER PUBLICATIONS

Defect Image Sample Generation With GAN for Improving Defect Recognition , by Niu et al., IEEE Transactions On Automation Science and Engineering, vol. 17, No. 3, Jul. 2020; pp. 1611-1622 (Year: 2020).*
Brown et al., "Language models are few-shot learners" Advances in neural information processing systems 33, 2020, 25 pages.

(Continued)

*Primary Examiner* — Vikkram Bali
(74) *Attorney, Agent, or Firm* — Fish & Richardson P.C.

(57) ABSTRACT

Methods, systems, and computer-readable storage media for a defect detection system that generates synthetic defect data that is representative of real-world defects in products. The synthetic defect data is included in training data for training a defect detection model. The defect detection model is deployed to a production environment to detect defects in products.

20 Claims, 5 Drawing Sheets

400

(56)         References Cited

OTHER PUBLICATIONS

Ho et al., "Denoising diffusion probabilistic models" Advances in neural information processing systems, 33, 2020, 12 pages.

Pathak et al., "Context encoders: Feature learning by inpainting" In Proceedings of the IEEE conference on computer vision and pattern recognition, 2016, 2536-2544.

Reimers et al., "Sentence-bert: Sentence embeddings using siamese bert-networks" CoRR, Submitted on Aug. 2019, arXiv:1908.10084v1, 11 pages.

Extended European Search Report in European Appln. No. 25152989.7, mailed on Jul. 1, 2025, 6 pages.

Extended European Search Report in European Appln. No. 25155829.2, mailed on May 23, 2025, 9 pages.

Huang et al., "Image difference captioning with instance-level fine-grained feature representation." IEEE transactions on multimedia 24, Apr. 2021, 2004-2017.

U.S. Appl. No. 18/582,802, filed Feb. 21, 2024, Chen et al.

U.S. Appl. No. 18/969,362, filed Dec. 5, 2024, Mishra et al.

Chen et al., "A zero-/few-shot anomaly classification and segmentation method for CVPR 2023 VAND workshop challenge tracks 1 &2. 1st Place on Zero-shot AD and 4th Place on Few-shot AD 2305" CoRR, Submitted on May 27, 2023, 10 pages.

Chen et al., "See-through-text grouping for referring image segmentation." Paper, Presented at Proceedings of the IEEE/CVF International Conference on Computer Vision, Seoul, South Korea, Oct. 27, 2019-Nov. 2, 2019, 7454-7463.

Deng et al., "PTMNet: Pixel-Text Matching Network for Zero-Shot Anomaly Detection," Paper, Presented at 2023 9th International Conference on Big Data and Information Analytics (BigDIA), Haikou, China, Dec. 15-17, 2023, 781-787.

Jeong et al., "Winclip: Zero-/few-shot anomaly classification and segmentation." Paper, Presented at Proceedings of the IEEE/CVF conference on computer vision and pattern recognition, Vancouver, BC, Canada, Jun. 17-24, 2023, 19606-19616.

Li et al., "Referring image segmentation via recurrent refinement networks." Proceedings of the IEEE Conference on Computer Vision and Pattern Recognition, Salt Lake City, UT, USA, Jun. 18-23, 2018, 5745-5753.

Liu et al., "Referring image segmentation using text supervision." Paper, Presented at Proceedings of the IEEE/CVF international conference on computer vision, Paris, France, Oct. 1-6, 2023, 22124-22134.

Shan et al., "Human-machine hybrid strategy for defect semantic segmentation with limited data." IEEE Transactions on Instrumentation and Measurement 73, Dec. 2023, 1-15.

Tao et al., "Deep learning for unsupervised anomaly localization in industrial images: A survey." IEEE Transactions on Instrumentation and Measurement 71, Aug. 2022, 1-21.

Wang, "Learning to detect and segment for open vocabulary object detection." Paper, Presented at Proceedings of the IEEE/CVF Conference on Computer Vision and Pattern Recognition, Vancouver, BC, Canada, Jun. 17-24, 2023, 7051-7060.

Yu et al., "Zero-shot Referring Image Segmentation with Global-Local Context Features," Paper, Presented at 2023 IEEE/CVF Conference on Computer Vision and Pattern Recognition (CVPR), Vancouver, BC, Canada, Jun. 18-22, 2023, 19456-19465.

Zhang et al., "Combined anomaly aware weakly supervised lightweight model for surface defect inspection." IEEE Transactions on Industrial Informatics 20.4, Jan. 2024, 6652-6663.

Zhang et al., "Gpt-4v-ad: Exploring grounding potential of vqa-oriented gpt-4v for zero-shot anomaly detection." CoRR, Submitted on Apr. 16, 2024, arXiv:2311.02612v2, 9 pages.

* cited by examiner

400

Generate context images from positive datasets — 402

Train defect generator model — 404

Provide context images by cropping negative images — 406

Generate synthetic defect data using DG — 408

Provide training data — 410

Train defect detection model — 412

Deploy defect detection model — 414

GENERATING MINORITY CLASS DEFECT DETECTION DATA FROM VISUAL INSPECTION DATASET USING SELF-SUPERVISED DEFECT GENERATOR

BACKGROUND

Defect detection is performed in manufacturing processes in an effort to ensure that defective products do not make it to market. With the development of computer vision techniques, automatic visual inspection is enabled through the user of machine learning (ML) models. For example, defect detection models can be trained on visual inspection (VI) datasets to identify classes (e.g., types) and locations of defects on products. However, the data-hungry nature of ML models requires a significant volume of VI datasets with significant sample sizes for each defect class in order to train a usable ML model. The difficulty in obtaining a sufficient number of training images depicting defects for each of multiple classes of defects causes training a robust defect detection model to be challenging. Such low defect sample size distribution results in the defect detection model being prone to overfitting.

SUMMARY

Implementations of the present disclosure are directed to a defect detection system for training and deploying defect detection models. More particularly, implementations of the present disclosure are directed to a defect detection system that generates synthetic defect data that is representative of real-world defects in products. The synthetic defect data is included in training data for training a defect detection model. The defect detection model is deployed to a production environment to detect defects in products.

In some implementations, actions include generating a first set of context images from a set of positive images, each positive image representing one or more defects occurring in products, each context image in the first set of context images including at least one cropped area cropping out a defect represented in a respective positive image, training a defect generation model using the set of context images, the defect generation model being trained to inpaint synthetic defects within cropped areas, generating a second set of context images from a set of negative images, each negative image representing a product absent any defect, each context image in the second set of context images including at least one cropped area cropping representing a target defect location, providing a set of synthetic defect data by processing the second set of context images through the defect generation model, for each context image in the second set of context images, the defect generation model inpainting a synthetic defect in the at least one cropped area to provide a synthetic defect image, training a defect detection model using training data that includes at least a portion of the set of synthetic defect data, and executing defect detection of products by processing images of the products through the defect detection model. Other implementations of this aspect include corresponding systems, apparatus, and computer programs, configured to perform the actions of the methods, encoded on computer storage devices.

These and other implementations can each optionally include one or more of the following features: the context images in the first set of context images are generated based on a text embedding that is representative of text that indicates a target defect class; the defect generation model is trained based on a text embedding that is representative of text that indicates a target defect class; generating a second set of context images from a set of negative images includes, for each negative image, providing at least one bounding box indicating a location within the negative image that a defect is to be inpainted and cropping an area of the bounding box to provide the at least one cropped area; providing a set of synthetic defect data by processing the second set of context images through the defect generation model includes providing a text embedding that is representative of text that indicates a target defect class to the defect generation model, the defect generation model inpainting a synthetic defect corresponding to the target defect class in each of the at least one cropped areas of the context images of the second set of context images; the set of synthetic defect data includes synthetic defect images representative of multiple defect classes; and the training data further includes at least a portion of the set of negative images.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
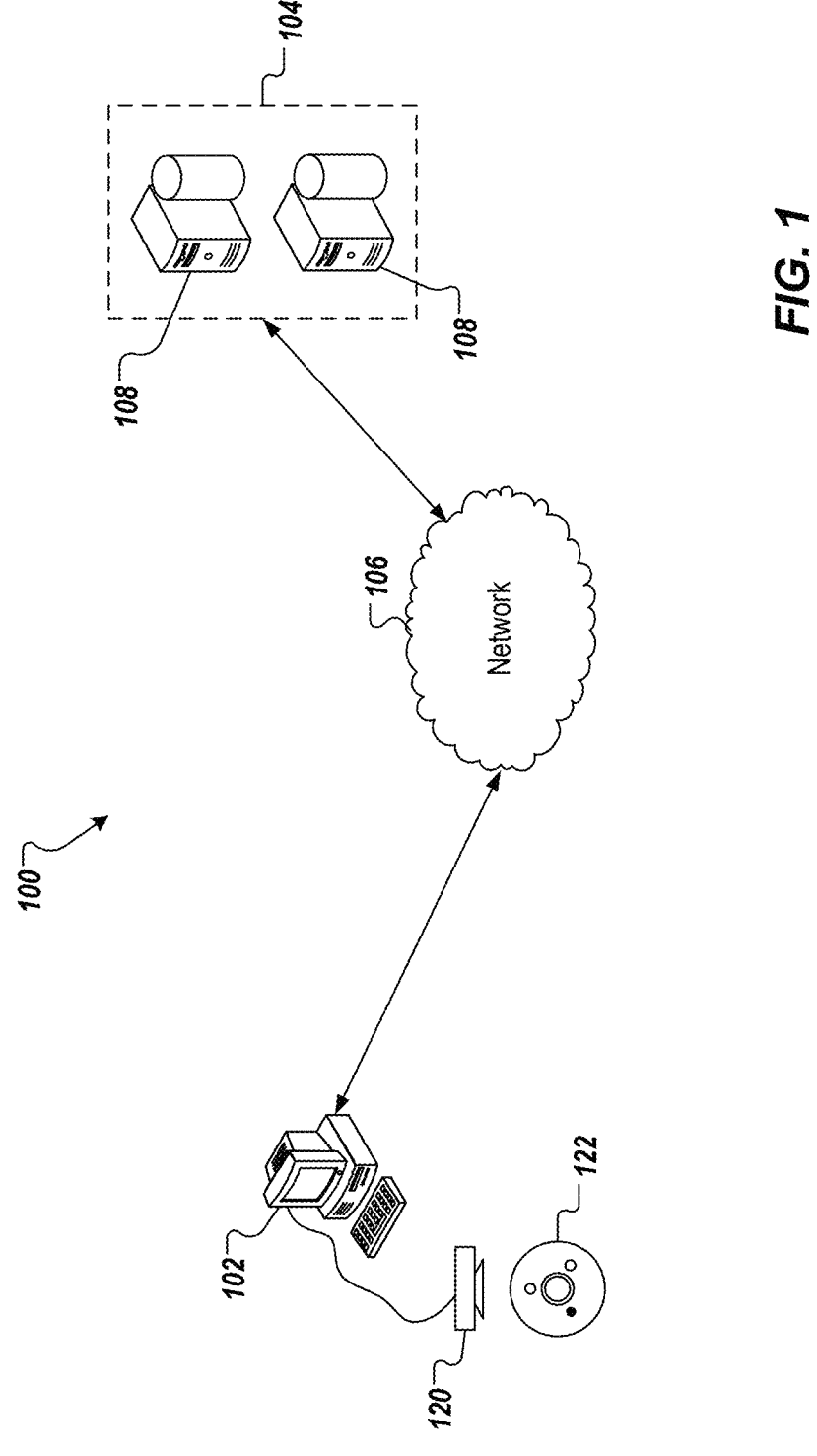
FIG. 1 depicts an example architecture that can be used to execute implementations of the present disclosure.

Implementations of the present disclosure are directed to a defect detection system for training and deploying defect detection models. More particularly, implementations of the present disclosure are directed to a defect detection system that generates synthetic defect data that is representative of real-world defects in products. The synthetic defect data is included in training data for training a defect detection model. The defect detection model is deployed to a production environment to detect defects in products.

Implementations can include actions of generating a first set of context images from a set of positive images, each positive image representing one or more defects occurring in products, each context image in the first set of context images including at least one cropped area cropping out a defect represented in a respective positive image, training a defect generation model using the set of context images, the defect generation model being trained to inpaint synthetic defects within cropped areas, generating a second set of context images from a set of negative images, each negative image representing a product absent any defect, each context image in the second set of context images including at least one cropped area cropping representing a target defect location, providing a set of synthetic defect data by processing the second set of context images through the defect generation model, for each context image in the second set of context images, the defect generation model inpainting a synthetic defect in the at least one cropped area to provide a synthetic defect image, training a defect detection model using training data that includes at least a portion of the set of synthetic defect data, and executing defect detection of products by processing images of the products through the defect detection model.

To provide further context for implementations of the present disclosure, and as introduced above, defect detection is performed in manufacturing processes in an effort to ensure that defective products do not make it to market. Defect detection can be described as the problem of identifying, localizing, and categorizing defective areas on the products and is typically performed in a visual inspection phase of supply chains. Visual inspection can be described as the process of inspecting products in a production line to identify defects for quality control.

With the development of computer vision techniques, automatic visual inspection is enabled through the user of machine learning (ML) models, such as deep neural networks (DNNs). For example, defect detection models can be trained on visual inspection (VI) datasets to identify classes (e.g., types) and locations of defects on products. Here, VI datasets include images of products that can be labeled for training (e.g., defective, non-defective). However, the data-hungry nature of DNNs requires a significant volume of VI datasets with significant sample sizes for each defect class in order to train a DNN. The innate characteristics of VI datasets make training DNNs challenging. For example, the majority of the images of real-world products contain no defects (e.g., products can have a defect rate of less than 0.0001%). Consequently, there are relatively few images representing defective products available resulting in a low defect sample size distribution in VI datasets. The difficulty in obtaining training images depicting defects causes training a robust defect detection model (e.g., a DNN) to be challenging. Such low defect sample size distribution results in the defect detection model being prone to overfitting and computationally inefficient.

In view of the above context, implementations of the present disclosure provide a defect detection system that generates synthetic defect data that is included in training data for training a defect detection model. More particularly, the defect detection system of the present disclosure generates the synthetic defect data as labeled images of products with defects using a self-supervised image inpainting on images without defects. That is, an image of a real-world product without defects is modified to provide a synthetic defect image that depicts one or more defects using self-supervised image inpainting. The synthetic defect image is used as synthetic defect data. In some implementations, and as described in further detail herein, inpainting is achieved using a denoising diffusion probabilistic based (DDPM-based) model. The synthetic defect data is used as training data to train a defect detection model. The synthetic defect data provides a defect sample size distribution (within the training data) that resolves technical problems of prior approaches (e.g., overfitting).

FIG. 1 depicts an example system 100 that can execute implementations of the present disclosure. The example system 100 includes a computing device 102, a back-end system 104, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 104 includes at least one server system 108. In some examples, the at least one server system 108 hosts one or more computer-implemented services that users can interact with using computing devices. For example, the server system 108 can host a defect detection system in accordance with implementations of the present disclosure.

In the example of FIG. 1, a camera 120 and an object 122 are depicted. The camera 120 can by any appropriate type of camera (e.g., video camera) that generates images representing objects, such as the object 122. In the context of the present disclosure, the camera 120 can generate images as digital data representing the object 122. The camera 120 can capture images of every side of the object 122, such as front, back, left, right, top, and bottom sides of the object 122. In some examples, multiple cameras 120 installed in different angles can be provided to capture images of every side of the object 122. In some examples, the object 122 can be rotated, so that the camera 120 can capture images of every side of the object 122.

In accordance with implementations, images can be processed by a defect detection system to determine whether the object 122, as represented within the image(s), includes any defects. In some examples, the defect detection system is executed on the computing device 102. In some examples, the defect detection system is executed in the back-end system 104. As described in further detail herein, the defect detection system executes a defect detection model (e.g., a ML model, such as a DNN) that is trained using synthetic defect data generated in accordance with implementations of the present disclosure. The defect detection model can process one or more images of the object 122 to classify the image(s) into one or more classes in a set of classes. Example classes can include, without limitation, no defect, defect type 1 (e.g., missing screw), defect type 2 (e.g., broken component), and so on.

Figure 2:
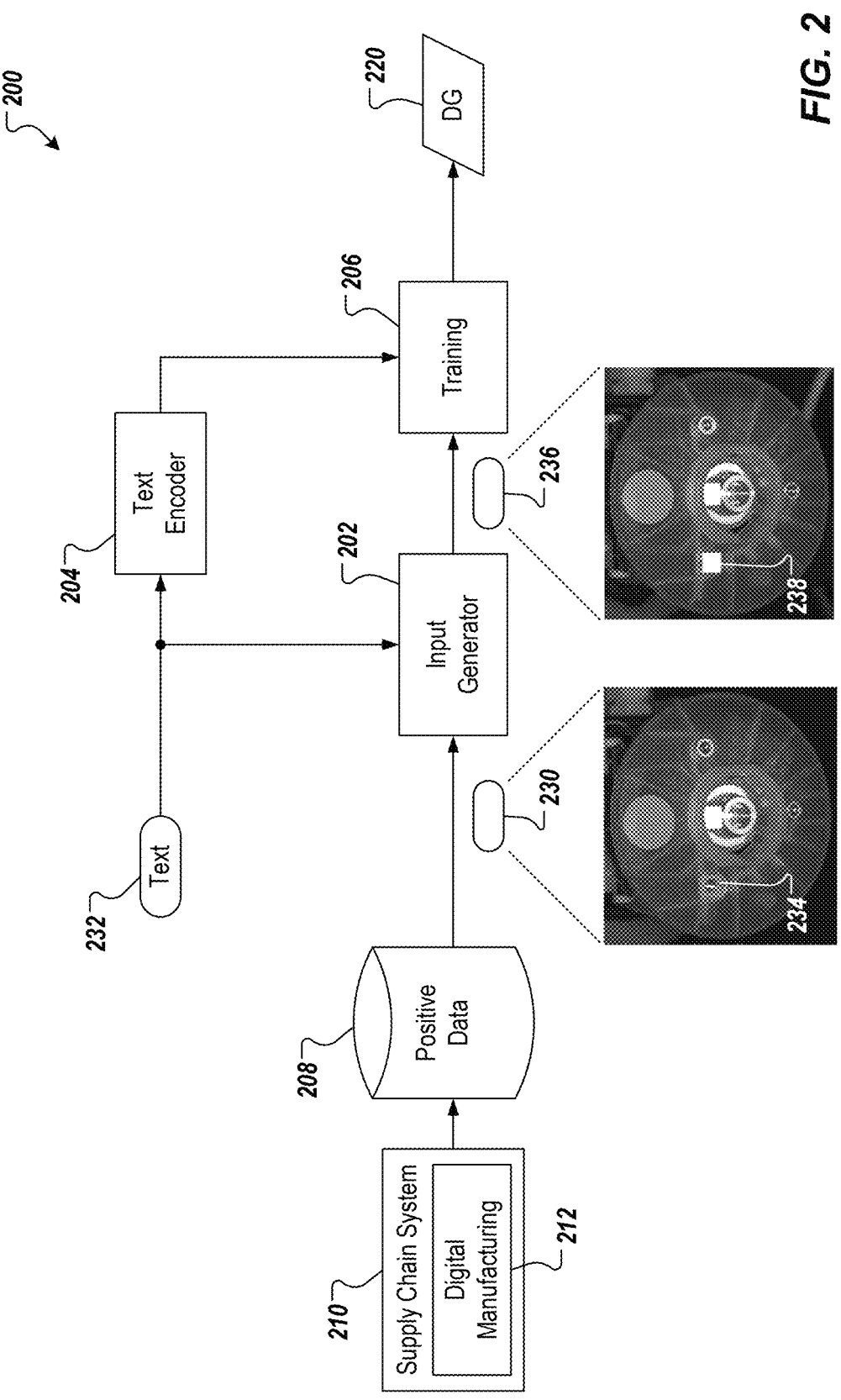
FIG. 2 depicts an example conceptual architecture for training in accordance with implementations of the present disclosure.

FIG. 2 depicts an example conceptual architecture 200 for training in accordance with implementations of the present disclosure. In the depicted example, conceptual architecture 200 includes an input generator 202, a text encoder 204, a training system 206, and a positive datastore 208. The positive datastore 208 stores actual defect images that depict real-world defects in products. In the context of the present disclosure, the actual defect images are referred to as positive data in that they are positive examples of defects. In some examples, the actual defect images are provided from a supply chain system 210 that includes a digital manufacturing sub-system 212. An example supply chain system can include, without limitation, SAP Supply Chain Management (SCM) provided by SAP SE of Walldorf, Germany.

In accordance with implementations of the present disclosure, a defect generator model 220 is trained using positive data provided from the positive datastore 208. In some examples, a positive dataset is provided and can represent multiple defect class (e.g., missing fastener, broken component). For example, the positive dataset includes actual defect images representing multiple defect classes. Each actual defect image, such as an actual defect image 230, depicts a real-world product with a defect. The actual defect image 230 further includes a bounding box that bounds a location of the defect. In the non-limiting example of FIG. 2, the actual defect image 230 depicts a product that should have fasteners fastened in multiple locations, but one of the fasteners is missing. In this example, a bounding box 234 bounds a location of the missing fastener.

In some implementations, the text 232 is provided and indicates a class of a defect that the defect generator model 220 is to be trained on. For example, the text 232 can be "missing fastener" indicating that the defect generator model 220 is to be trained to generate synthetic defect data (images) that depict products with missing fastener(s). The text encoder 204 encodes the text 232. For example, the text encoder 204 can process the text 232 to generate an embedding as a multi-dimensional vector that represents the text 232 in an embedding space. In some examples, the text encoder 204 can be provided as a pre-trained embedding model. Example embedding models can include, without limitation, a Bidirectional Encoder Representations from Transformers (BERT) model. An example BERT model can include, without limitation, a Sentence-BERT model, which includes Siamese BERT networks. It is contemplated, however, that any appropriate embedding model can be used.

In some implementations, the input generator 202 receives positive data, such as the actual defect image 230 and the text embedding. In some examples, the input generator 202 filter the defects in the actual defect images to identify defects that are from the target defect class represented by the text embedding (e.g., based on the text 232) and obtain the class and bounding box data (e.g., pixel coordinates corresponding to the bounding box). In some examples, each actual defect image stored in the positive datastore 208, such as the actual defect image 230, is a labeled image that includes one or more labels, each label indicating a target defect class, and includes one or more bounding boxes, each bounding box corresponding to a label and including bounding box coordinates within the image. The input generator 202 can filter through the labels to find images with the target defect class. In some implementations, the input generator 202 crops the defect from the actual defect image to provide a training image. In the example of FIG. 2, the input generator 202 crops the area bounded by the bounding box 234 to provide a context image 236 that includes a cropped area 238.

In accordance with implementations of the present disclosure, the defect generator model 220 is trained on a set of context images that are determined for the target defect class. For example, multiple context images, such as the context image 236, can be generated for the target defect class represented by the text 232 (e.g., missing fastener). In some implementations, the defect generator model 220 is a DDPM-based model, which can be described as a parameterized Markov chain that is trained using variational inference to generate, in the context of the present disclosure, synthetic defect data. That is, for example, the defect generator model 220 is trained to inpaint cropped areas within context images, such as the cropped area 238 of the context image 236, with original target defect pixels. In the example of FIG. 2, the defect generator model 220 is trained to inpaint pixels depicting a missing fastener within the cropped area 238 of the context image 236. The defect generator model 220 is deployed to generate synthetic defect data, as described in further detail herein.

In further detail, during training and among other training data, input to the (in-training) defect generation model is the text embedding (output of the text encoder 204) and the context image 236 (image with the defect cropped out). The output of the (in-training) defect generation model is an image with the cropped portion filled in to depict the defect. The goal is for the output to be the same as the original image (e.g., the defect depicted in the bounding box 234). In short, the defect generation model is trained to fill in the cropped area 238 with the defect depicted in the bounding box 234. This is done over multiple iterations of training with multiple training samples (e.g., tuples of [text embedding, context image, actual defect image]). In some examples, the defect generator model can be trained on multiple defect classes, where the text embedding guides training on the respective defect classes.

Figure 3:
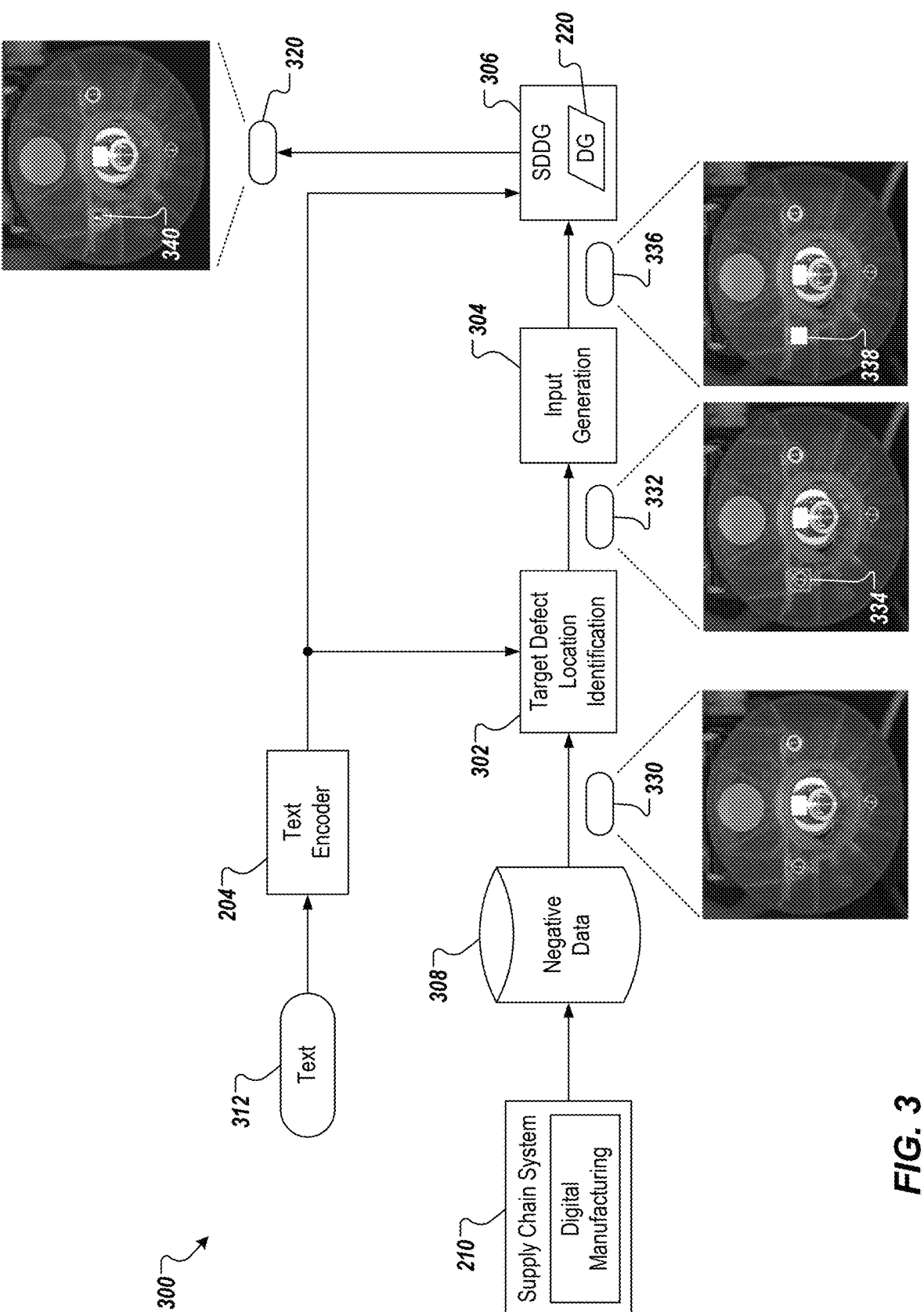
FIG. 3 depicts an example conceptual architecture for generating training data in accordance with implementations of the present disclosure.

FIG. 3 depicts an example conceptual architecture 300 for generating synthetic defect data to be used as training data in accordance with implementations of the present disclosure. In the depicted example, the conceptual architecture 300 includes a target defect location identification module 302, an input generation module 304, a synthetic defect data generation (SDDG) module 306, and a negative datastore 308. The conceptual architecture 300 further includes the text encoder 204 and the supply chain system 210. As described in further detail herein, the SDDG module 306 executes the defect generator model 220 to generate synthetic defect data from negative datasets that represent real-world products that are absent defections. The synthetic defect data can be used to train a defect detection model that is deployed for inference to detect defects in products.

In further detail, the negative datastore 308 stores actual images that depict real-world products without defects (e.g., non-defective products). In the context of the present disclosure, the actual images are referred to as negative data in that they do not depict defects. In some examples, the actual images are provided from the supply chain system 210.

In some implementations, for a target defect class, the target defect location identification module 302 automatically identifies a target defect location within an actual image from the negative datastore 308. In some examples, the target defect class is represented in text 312, which indicates a class of a defect that the synthetic defect data is to depict. For example, the text 312 can be "missing fastener" indicating that the synthetic defect data are to depict products with missing fastener(s). The text encoder 204 encodes the text 312. For example, and as discussed above, the text encoder 204 can process the text 312 to generate an embedding as a multi-dimensional vector that represents the text 312 in an embedding space. In some examples, the target defect location identification module 302 process an actual image in view of the text embedding to identify a target defect location that is represented by a bounding box, in which a synthetic defect is to be drawn. The bounding box variables are sampled from a multivariate normal distribution with mean and standard deviation of the existing positive data (e.g., the positive data from the positive datastore 208 of FIG. 2).

In the example of FIG. 3, the target defect location identification module 302 receives an actual image 330 that depicts a real-world product that is absent any defects. Based on the text embedding of the text 312, the target defect location identification module 302 identifies a target defect location within the actual image 330 and provides a modified image 332 that includes a bounding box 334 at the target defect location. The modified image 332 is process by the input generation module 304, which generates a cropped image 336. For example, the input generation module 304 crops the area of the bounding box 334 to provide the cropped image 336, which includes a cropped area 338. In this manner, a non-defect feature (e.g., a fastener) is cropped from the actual image 330.

In further detail, a multivariate normal distribution can be provided as four-(4) dimensional (e.g., x coordinate, y coordinate, width, and height of the target defect). Each defect type will have a normal distribution describing the defect's possible location, and this information is stored together with the corresponding defect name. Given the name of the defect, the normal distribution can be retrieved and can be sampled to obtain a multi-dimensional vector (e.g., x coord, y coord, width, height) denoting the defect location (e.g., as a bounding box). This defect location is used to crop out the defect to obtain the cropped area 338 from the bounding box 334 (which contains a non-defective part).

In some implementations, the SDDG module 306 receives the text embedding and the cropped image 336. The SDDG module 306 processes the text embedding and the cropped image 336 through the defect generation model 220, which generates a synthetic defect image 320 that depicts a defect 340 representative of the defect class text 312. More particularly, the defect generation model 220 inpaints a defect corresponding to the text 312 within the cropped area 338 of the cropped image 336 to provide the synthetic defect image 320. While the example of FIG. 3 depicts a bounding box around the defect 340, it is contemplated that the synthetic defect image 320 need not include a bounding box depicted therein. In some implementations, multiple actual images, such as the actual image 330, can be processed to generate multiple synthetic defect images, such as the synthetic defect image 320, to represent the defect class indicated by the text 312 (e.g., missing screw).

In some implementations, multiple sets of synthetic defect data can be generated using the defect generation model 220. For example, a first set of synthetic defect data can be generated based on first text indicating a first target defect class (e.g., missing fastener) and a second set of synthetic defect data can be generated based on second text indicating a second target defect class (e.g., broken component). In this manner, the synthetic defect data can represent multiple classes of defects that can occur to a product.

In accordance with implementations of the present disclosure, the synthetic defect data (the synthetic defect images) can be used to train a defect detection model. For example, the synthetic defect data can be included in training data that is used to train the defect detection model. In some examples, the training data includes the synthetic defect data as well as real-world non-defect data. In some examples, the real-world non-defect data can include actual images depicting negative examples (e.g., actual images of a real-world product that is absent defects). In some examples, the synthetic defect data can include multiple sets of synthetic defect data to represent multiple classes of defects that can occur to a product within the training data. In accordance with implementations of the present disclosure, a sufficient amount of synthetic data can be included in the training data to provide an appropriate defect sample size distribution within the training data.

In some examples, the defect detection model is iteratively trained on the training data, where, during an iteration, one or more parameters of the defect detection model are adjusted, and an output is generated based on the training data. For each iteration, a loss value is determined based on a loss function. The loss value represents a degree of accuracy of the output of the defect detection model for the respective iteration. The loss value can be described as a representation of a degree of difference between the input to the defect detection model and the expected output of the defect detection model. In some examples, if the loss value does not meet an expected value (e.g., is not equal to zero), parameters of the defect detection model are adjusted in another iteration of training. In some instances, this process is repeated until the loss value meets the expected value or a number of epochs (iterations) of training have been performed.

After training, the defect detection model is deployed for inference to detect defects in products. In some examples, the defect detection model can be incorporated in a detect detection system that processes images of real-world products to determine whether products include defects. For example, and with reference to FIG. 1, one or more images of the object 122 generated by the camera 120 can be processed through the defect detection model of the defect detection system to determine whether the product includes any defect(s). In some examples, the defect detection model outputs a class in a set of class, which can include, without limitation, no defect, missing fastener, and broken component, among other possible classes.

Figure 4:
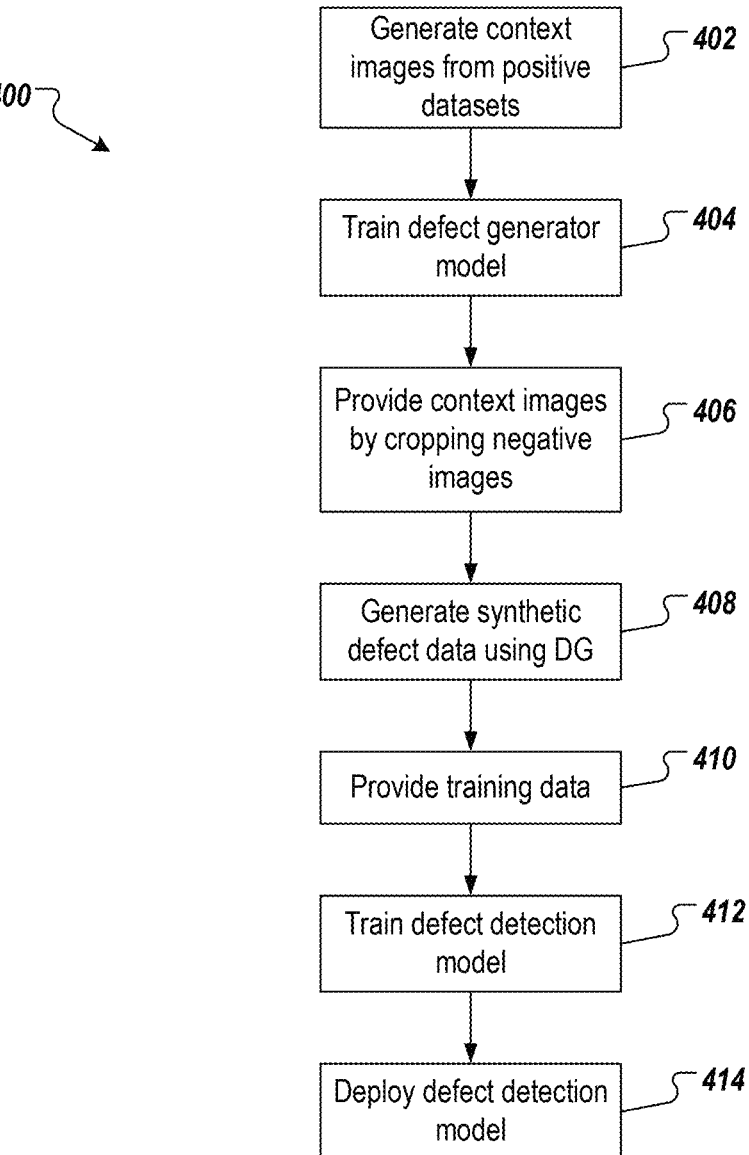
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

Context images are generated from positive datasets (402). For example, and as described in detail herein with reference to FIG. 2, context images, such as the context image 236, are generated for a target defect class, represented in the text 232, by the input generator 202. A defect generator model is trained (404). For example, and as described in detail herein, a set of context images (e.g., multiple context images corresponding to the target defect class) is used to train the defect generator model 220.

Context images are provided by cropping negative images (406). For example, and as described in detail herein with reference to FIG. 3, the target defect location identification module 302 receives an actual image 330 that depicts a real-world product that is absent any defects, and, based on the text embedding of the text 312, the target defect location identification module 302 identifies a target defect location within the actual image 330 and provides a modified image

332 that includes a bounding box 334 at the target defect location. The modified image 332 is process by the input generation module 304, which generates a cropped image 336.

Synthetic defect data is generated using the defect generator model (408). For example, and as described in detail herein with reference to FIG. 3, the SDDG module 306 receives the text embedding and the cropped image 336 and processes the text embedding and the cropped image 336 through the defect generation model 220, which generates a synthetic defect image 320 that depicts a defect 340 representative of the defect class indicated by the text 312.

Training data is provided (410). For example, and as described in detail herein, the synthetic defect data can be included in training data that is used to train the defect detection model. In some examples, the training data includes the synthetic defect data as well as real-world non-defect data. In some examples, the synthetic defect data can include multiple sets of synthetic defect data to represent multiple classes of defects that can occur to a product within the training data. A defect detection model is trained (412). For example, and as described in detail herein, the defect detection model is iteratively trained on the training data. The defect detection model is deployed (414). For example, and as described in detail herein, the defect detection model is deployed for inference to detect defects in products. In some examples, the defect detection model can be incorporated in a detect detection system that processes images of real-world products to determine whether products include defects.

Implementations of the present disclosure provide one or more technical advantages. For example, implementations of the present disclosure generate synthetic defect data (positive images depicting defects) without any additional annotation cost, the synthetic defect images being labeled as a target defect class and sampled bounding box location used to obtain text embedding and context image. This resolves the data imbalanced problem in VI datasets, where positive data is significantly underrepresented. This also enables the defect detection models to be trained in a manner that better learns the separation between positive images (defects) and negative images (no defects) for deployment for real-world defect detection. Further, the defect generation model of the present disclosure is DDPM-based, providing a best-performing generative model for image generation. It is shown DDPM based models for image inpainting can generate inpainted regions that are more semantically meaningful than other approaches. As another advantage, the defect generation model is trained with image inpainting objective instead of generating a complete image. That is, inpainting within a cropped area of an image instead of generating a complete image. Image inpainting ensures the context region follows the training set distribution and the inpainting task is easier to train than image generation. By training with both the generated positive image (synthetic defect image) and the corresponding original negative image, the defect detection model is able to focus on areas that possibly to contain defects (e.g., locations of fasteners). In this manner, the defect detection model is more computationally efficient (conserving technical resources) and is more accurate than other approaches in training defect detection models.

Figure 5:
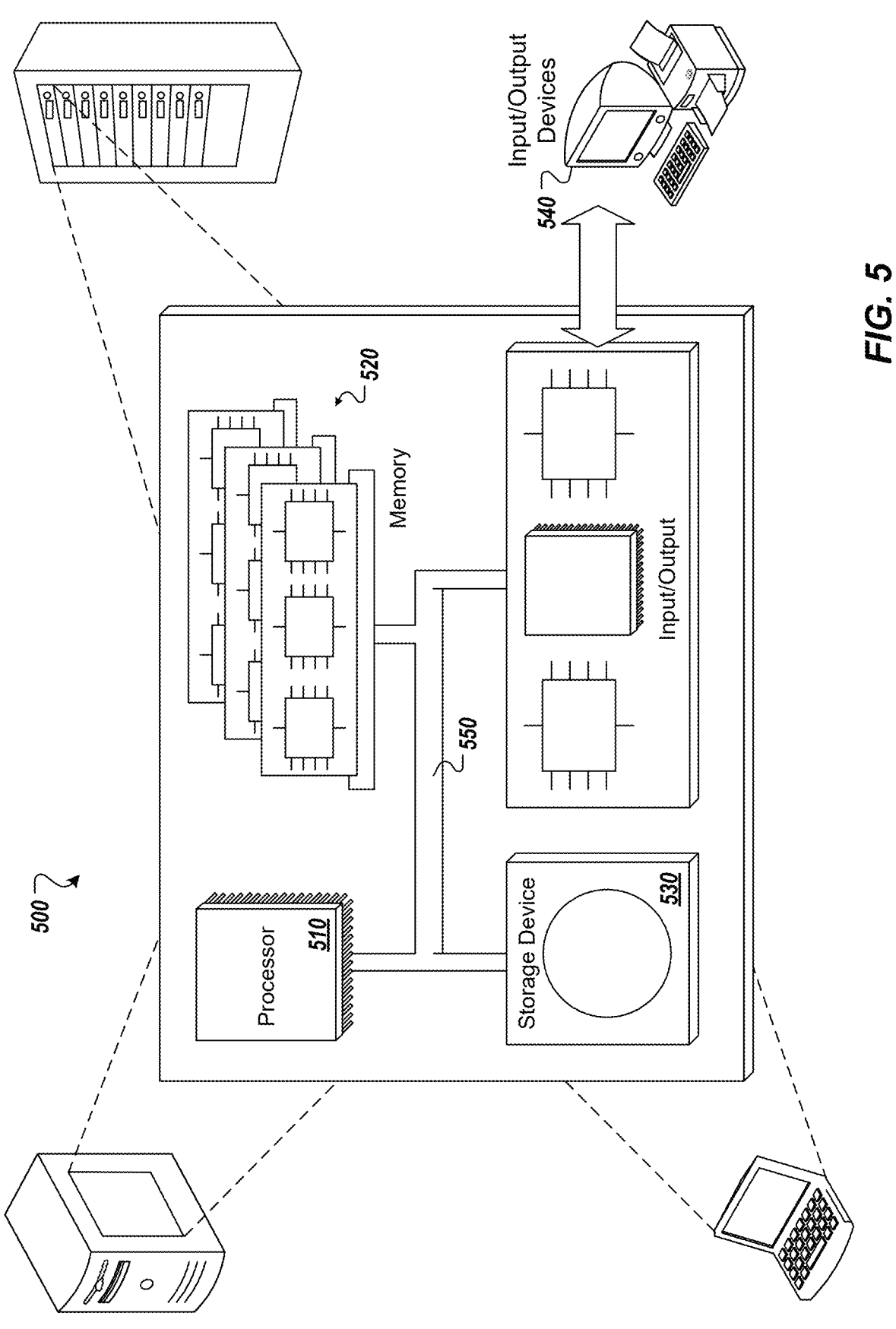
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for detecting defects in products, the method being executed by one or more processors and comprising:

generating a first set of context images from a set of positive images, each positive image representing one or more defects occurring in products, each context image in the first set of context images comprising at least one cropped area cropping out a defect represented in a respective positive image;

training a defect generation model using the set of context images, the defect generation model being trained to inpaint synthetic defects within cropped areas;

generating a second set of context images from a set of negative images, each negative image representing a product absent any defect, each context image in the second set of context images comprising at least one cropped area cropping representing a target defect location;

providing a set of synthetic defect data by processing the second set of context images through the defect generation model, for each context image in the second set of context images, the defect generation model inpainting a synthetic defect in the at least one cropped area to provide a synthetic defect image;

training a defect detection model using training data that comprises at least a portion of the set of synthetic defect data; and executing defect detection of products by processing images of the products through the defect detection model.

2. The method of claim 1, wherein the context images in the first set of context images are generated based on a text embedding that is representative of text that indicates a target defect class.

3. The method of claim 1, wherein the defect generation model is trained based on a text embedding that is representative of text that indicates a target defect class.

4. The method of claim 1, wherein generating a second set of context images from a set of negative images comprises, for each negative image providing at least one bounding box indicating a location within the negative image that a defect is to be inpainted and cropping an area of the bounding box to provide the at least one cropped area.

5. The method of claim 1, wherein providing a set of synthetic defect data by processing the second set of context images through the defect generation model comprises providing a text embedding that is representative of text that indicates a target defect class to the defect generation model, the defect generation model inpainting a synthetic defect corresponding to the target defect class in each of the at least one cropped areas of the context images of the second set of context images.

6. The method of claim 1, wherein the set of synthetic defect data comprises synthetic defect images representative of multiple defect classes.

7. The method of claim 1, wherein the training data further comprises at least a portion of the set of negative images.

8. A non-transitory computer-readable storage medium coupled to one or more processors and having instructions stored thereon which, when executed by the one or more processors, cause the one or more processors to perform operations for detecting defects in products, the operations comprising:

generating a first set of context images from a set of positive images, each positive image representing one or more defects occurring in products, each context image in the first set of context images comprising at least one cropped area cropping out a defect represented in a respective positive image;

training a defect generation model using the set of context images, the defect generation model being trained to inpaint synthetic defects within cropped areas;

generating a second set of context images from a set of negative images, each negative image representing a product absent any defect, each context image in the second set of context images comprising at least one cropped area cropping representing a target defect location;

providing a set of synthetic defect data by processing the second set of context images through the defect generation model, for each context image in the second set of context images, the defect generation model inpainting a synthetic defect in the at least one cropped area to provide a synthetic defect image;

training a defect detection model using training data that comprises at least a portion of the set of synthetic defect data; and executing defect detection of products by processing images of the products through the defect detection model.

9. The non-transitory computer-readable storage medium of claim 8, wherein the context images in the first set of context images are generated based on a text embedding that is representative of text that indicates a target defect class.

10. The non-transitory computer-readable storage medium of claim 8, wherein the defect generation model is trained based on a text embedding that is representative of text that indicates a target defect class.

11. The non-transitory computer-readable storage medium of claim 8, wherein generating a second set of context images from a set of negative images comprises, for each negative image providing at least one bounding box indicating a location within the negative image that a defect is to be inpainted and cropping an area of the bounding box to provide the at least one cropped area.

12. The non-transitory computer-readable storage medium of claim 8, wherein providing a set of synthetic defect data by processing the second set of context images through the defect generation model comprises providing a text embedding that is representative of text that indicates a target defect class to the defect generation model, the defect generation model inpainting a synthetic defect corresponding to the target defect class in each of the at least one cropped areas of the context images of the second set of context images.

13. The non-transitory computer-readable storage medium of claim 8, wherein the set of synthetic defect data comprises synthetic defect images representative of multiple defect classes.

14. The non-transitory computer-readable storage medium of claim 8, wherein the training data further comprises at least a portion of the set of negative images.

15. A system, comprising:
a computing device; and
a computer-readable storage device coupled to the computing device and having instructions stored thereon which, when executed by the computing device, cause the computing device to perform operations for detecting defects in products, the operations comprising:
generating a first set of context images from a set of positive images, each positive image representing one or more defects occurring in products, each context image in the first set of context images comprising at least one cropped area cropping out a defect represented in a respective positive image;

training a defect generation model using the set of context images, the defect generation model being trained to inpaint synthetic defects within cropped areas;
generating a second set of context images from a set of negative images, each negative image representing a product absent any defect, each context image in the second set of context images comprising at least one cropped area cropping representing a target defect location;
providing a set of synthetic defect data by processing the second set of context images through the defect generation model, for each context image in the second set of context images, the defect generation model inpainting a synthetic defect in the at least one cropped area to provide a synthetic defect image;
training a defect detection model using training data that comprises at least a portion of the set of synthetic defect data; and
executing defect detection of products by processing images of the products through the defect detection model.

16. The system of claim 15, wherein the context images in the first set of context images are generated based on a text embedding that is representative of text that indicates a target defect class.

17. The system of claim 15, wherein the defect generation model is trained based on a text embedding that is representative of text that indicates a target defect class.

18. The system of claim 15, wherein generating a second set of context images from a set of negative images comprises, for each negative image providing at least one bounding box indicating a location within the negative image that a defect is to be inpainted and cropping an area of the bounding box to provide the at least one cropped area.

19. The system of claim 15, wherein providing a set of synthetic defect data by processing the second set of context images through the defect generation model comprises providing a text embedding that is representative of text that indicates a target defect class to the defect generation model, the defect generation model inpainting a synthetic defect corresponding to the target defect class in each of the at least one cropped areas of the context images of the second set of context images.

20. The system of claim 15, wherein the set of synthetic defect data comprises synthetic defect images representative of multiple defect classes.

* * * * *